United States Patent [19]

Kameyama et al.

[11] Patent Number: 5,009,554
[45] Date of Patent: Apr. 23, 1991

[54] MACHINE TOOL

[75] Inventors: Fumio Kameyama, Nagoya; Chikamasa Hattori, Ichinomiya, both of Japan

[73] Assignee: Brother Kogyo Kabushiki Kaisha, Nagoya, Japan

[21] Appl. No.: 577,125

[22] Filed: Sep. 4, 1990

[30] Foreign Application Priority Data

Sep. 9, 1989 [JP] Japan .................. 1-234032

[51] Int. Cl.⁵ .......................... B23C 1/06; B23B 47/06
[52] U.S. Cl. .................. 409/231; 10/129 R; 408/129; 408/238
[58] Field of Search ............ 409/231, 233, 141, 183; 408/239 R, 238, 129, 124, 139, 138; 310/168; 384/107; 318/254, 685, 602; 10/129 R, 139 R

[56] References Cited

U.S. PATENT DOCUMENTS 4,167,218  9/1979  Horiuchi .................. 409/233 X
4,534,686  8/1985  Nakamura et al. ............ 409/231
4,583,894  4/1986  Mitchell .................. 409/233
4,925,348  5/1990  Krüsi ..................... 409/231

FOREIGN PATENT DOCUMENTS 695068  10/1984  U.S.S.R. ................. 409/231

Primary Examiner—William Briggs
Attorney, Agent, or Firm—Oliff & Berridge

[57] ABSTRACT

A machine tool with a spindle for machining a large-diameter workpiece in that a servo motor for moving a spindle in the axial direction and a variable reluctance motor for rotating the spindle are installed in a housing, and a synchronous controller for synchronizing and driving the above-mentioned servo motor and the variable reluctance motor is provided. The variable reluctance motor has a characteristic in that a large driving torque can be obtained in a low rotating speed. By using a variable reluctance motor as a spindle motor, therefore, it is possible to obtain a large torque without providing a large size motor, and also possible to realize a large-diameter machining by a small-size unit.

19 Claims, 3 Drawing Sheets

MACHINE TOOL

BACKGROUND OF THE INVENTION

This invention relates to a machine tool for machining a workpiece that machines by reciprocating tools, such as taps and drills, in an axial direction while rotating them about their axis.

One example of this type of machine tool is a tapping unit for tapping a workpiece. This machine has a spindle which is rotatably provided around an axis in a housing. The spindle is reciprocated in the axial direction by a feed motor and also rotated at a low speed by a spindle motor. The spindle is equipped with a tap at its end portion to apply tapping to a workpiece. Generally, a DC motor or an AC inductive motor has been adopted as the above-mentioned spindle motor.

Concerning the above-mentioned tapping unit, miniaturization and weight reduction is desirable. However, it has also been desired that even a small-type tapping unit be able to tap a large-diameter workpiece. In case a DC motor is adopted as the above-mentioned spindle motor, a large size spindle motor is required to obtain sufficient torque to tap a large-diameter workpiece. As an inevitable consequence, the unit becomes a large system. Moreover, since the DC motor utilizing a permanent magnet includes a problem of demagnetization, it is impossible to provide a large current to get a large driving torque. On the other hand, in case an AC inductive motor is adopted, it is hard to obtain a large torque. It is, therefore, necessary to use a large size motor or reduce the speed of the motor by a reduction gear. As a result, the unit becomes a large scale unit or the revolution speed is reduced. Accordingly, the conventional tapping unit is still insufficient to meet the needs for miniaturization and a realization of high torque.

SUMMARY OF THE INVENTION

An object of the present invention is to provide a machine tool which is able to obtain a large torque and also to machine a large-diameter workpiece without necessitating a large size unit.

To achieve the above-mentioned object, the machine tool of the present invention includes the following means. Namely, a machine tool with a spindle which is rotatably supported around an axis in a housing, for machining a workpiece by a tool attached at the end portion of the spindle by reciprocating the spindle in the axial direction, includes a servo motor installed in the housing for moving the spindle in the axial direction, a variable reluctance motor installed in the housing for rotating the spindle, and a synchronous control means for synchronizing and actuating the servo motor and the variable reluctance motor.

The servo motor for moving a spindle in the axial direction and a variable reluctance motor for rotating the spindle of the present invention are installed in a small housing, and they are synchronized and actuated by the synchronous control means.

DETAILED EXPLANATION OF PREFERRED EMBODIMENT

Figure 1:
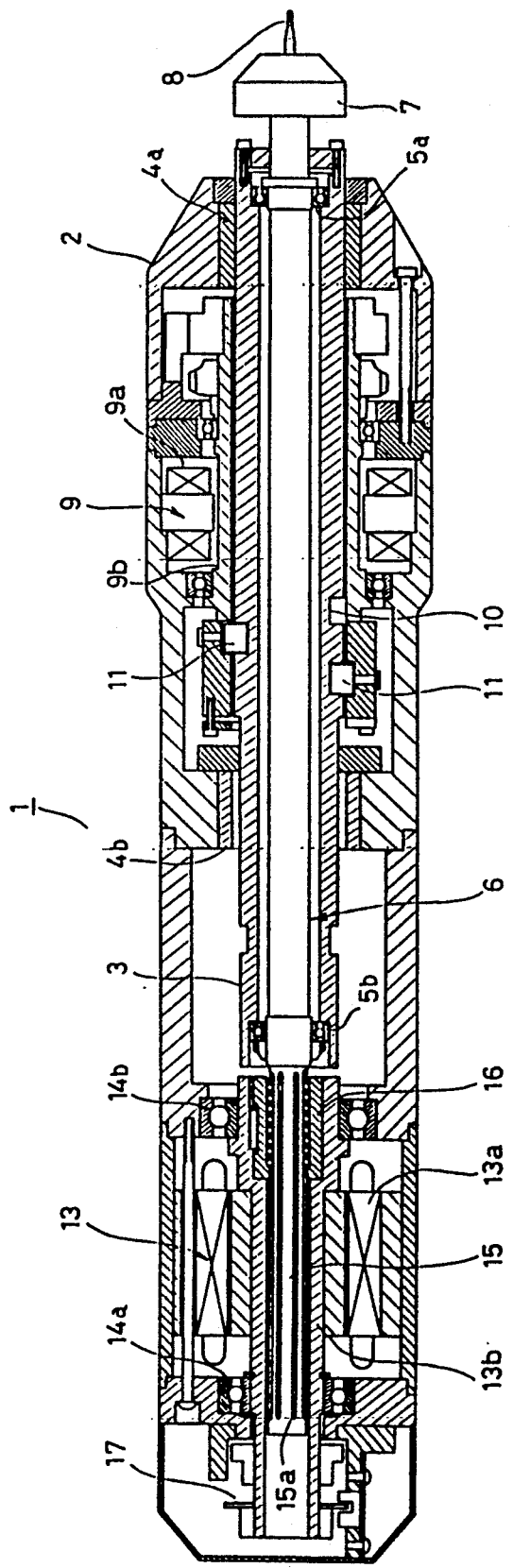
FIG. 1 is a longitudinal sectional view of a whole machine tool.

FIG. 1 shows the whole constitution of a tapping unit 1 as a machine tool of the present invention. In a housing 2 which has an almost cylindrical shape as a whole, a cylindrical quill 3 is supported via bearings 4a and 4b to be able to move in the left and right directions of the drawing. In this quill 3, a spindle 6 is rotatably supported via rolling bearings 5a and 5b. The spindle 6 is supported to be rotatable around the axis of the spindle 6, and it is also movable in reciprocation with the above-mentioned quill 3 in the axial direction of the housing 2. The end portion of the spindle 6 (shown in the right-hand of the drawing) penetrates the quill 3 and protruding outside from the end of the housing 2. A tap holder 7 is attached to the end portion of the spindle 6; moreover, a tap 8 is removably attached to the tap holder 7. The base of the spindle 6 (shown in the left-hand of the drawing) is protruding from the left side of the quill 3 in a housing 2.

The housing 2 is provided with a feed motor 9 composed of a servo motor for moving the spindle 6 in the axial direction. This feed motor 9 is located on the inside surface near the end of the housing 2. The feed motor 9 is equipped with a stator 9a which is attached to the inside surface of the housing 2 and with a hollow rotor 9b which is rotatably attached to the inside surface of the stator 9a. The quill 3 is inserted into the hollow rotor 9. Moreover, plural cam followers 11 provided in the hollow rotor side are slidably engaged in a cam groove 10 which is spirally formed on the outer surface of the quill 3. In the above-mentioned constitution, the rotation of the feed motor 9 is converted into the movement in the axial direction of the quill 3, thereby the spindle 6 is reciprocated with the quill 3 in the axial direction by the reverse rotation of the feed motor 9. Moreover, the feed motor 9 is controlled to rotate by a synchronous control circuit 12 (shown in FIG. 2) as a synchronous control means.

On the other hand, a spindle motor 13 which is composed of a variable reluctance motor is installed in the housing 2 for rotating the spindle 6. The spindle motor 13 is located on the peripheral surface of the base portion of the spindle 6. The spindle motor 13 is equipped with a stator 13a attached to the inner surface of the housing 2 and a hollow rotor 13b which is rotatably attached to the inner surface of the rotor 13a by means of bearings 14a and 14b. The base of the spindle 6 is formed as a spline 15, and long spline grooves 15a in the axial direction are formed on the outer surface of the spindle 6. The spline 15 is inserted into the hollow rotor 13b. Moreover, a spline nut 16 is engaged with the hollow rotor 13b of the spindle motor 13, and the spline 15 is inserted into the spline nut 16 so as to engage with the spline grooves 15a. The spline nut 16 is relatively movable in the axial direction along the spline grooves 15a. Thus, the rotation of the spindle motor 13 is directly transmitted to the spindle 6 to rotate the spindle 6 regardless of the position in the axial direction of the spindle 6.

Figure 2:
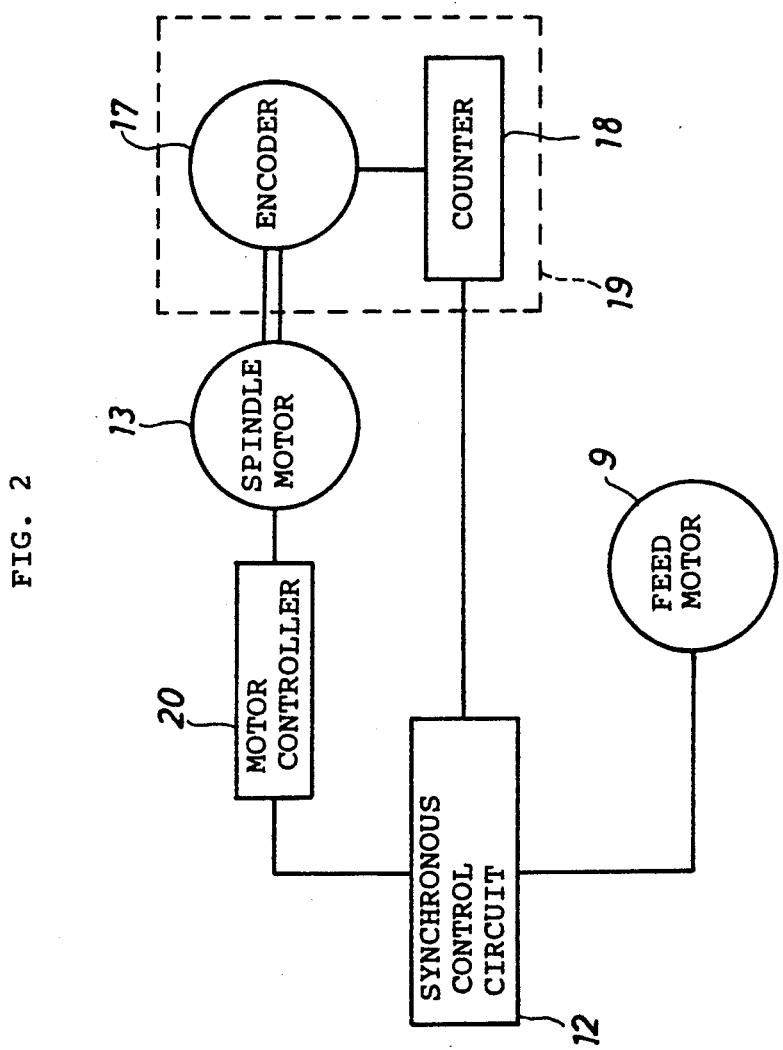
FIG. 2 is a block diagram showing an electrical constitution of the present embodiment.

As shown in FIG. 2, the spindle motor 13 is equipped with a rotating position detector 19 which is composed of an encoder 17 for detecting the rotating position of the hollow rotor 13b and a counter 18 for calculating the output pulse from the encoder 17. The detection signal of the rotating position detector 19 is input into the aforementioned synchronous control circuit 12. Then, the spindle motor 13 is rotated and controlled by the synchronous control circuit 12 by means of a motor controller 20. The synchronous control circuit 12 synchronously controls the rotation of the spindle motor 13 and the reciprocation of the feed motor 9 such that the spindle 6 reciprocates at a predetermined ratio of the rotating speed corresponding to the pitch of the tap 8, etc. Thus, the spindle motor 13 rotates the spindle 6 while the feed motor synchronously reciprocates the spindle 6 in the axial direction.

In the above-mentioned constitution, when tapping is applied to a workpiece (not shown), the spindle motor 13 and the feed motor 9 are rotated, and the spindle 6 moves forward in the axial direction (to the right in FIG. 1) while it is rotating. Thus, tapping is applied to the workpiece by the tap 8 attached to the end of the spindle 6. In this case, since the rotating speed and the advancing speed of the spindle 6 are controlled by the synchronous control circuit 12, the speed ratio can be optionally set. Accordingly, machining corresponding to the pitch of the tap 8 can be realized.

In this tapping unit 1, which adopts a variable reluctance motor to the spindle motor 13, the operational effects as set forth can be obtained.

Figure 3:
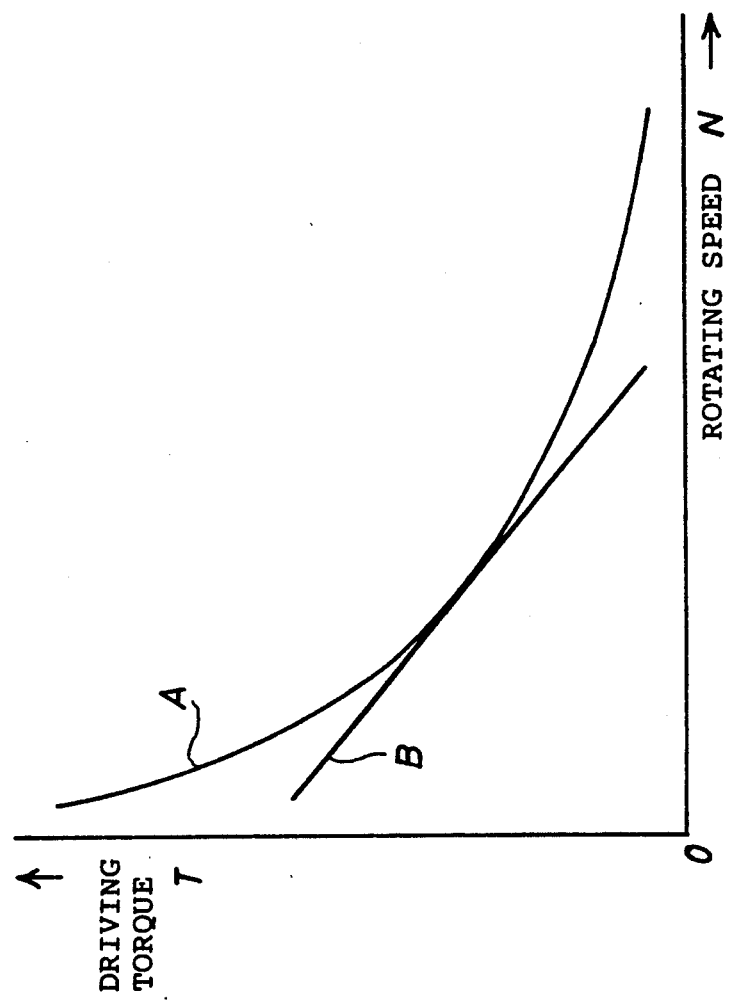
FIG. 3 is a characteristic diagram showing the relation between the driving torque and the rotating speed of a variable reluctance motor and a DC motor.

As it is known, the variable reluctance motor does not include a permanent magnet, so that there is no need to consider the problem of demagnetization. Accordingly, it is possible to apply a large current to the spindle motor 13 to obtain a large driving torque. It is therefore possible to rotate the spindle 6 and the tap 8 with a high torque. Moreover, concerning a variable reluctance motor, it is known that a driving torque T is in nearly inverse proportion to the square of rotating speed N as shown by a curve A in FIG. 3. On the other hand, in a DC motor which is generally used for the spindle motor, the driving torque T and the rotating speed N has a relation shown by a straight line B in FIG. 3. In case of AC inductive motor, it is difficult to obtain large torque in comparison with the DC motor or the variable reluctance motor, so that it is required to enlarge the motor or to install a reducer. As described in the above, the variable reluctance motor which can obtain large driving torque in a low rotating speed is suitable to machining such as tapping, and it is superior to the DC motor and the AC inductive motor in its characteristics.

The spindle motor 13 composed of a variable reluctance motor rotates the spindle 6 and the tap 8 with a large driving torque and thereby realizes tapping of large-diameter workpiece without making a large-size spindle motor 13.

In the present embodiment, the spindle motor utilizing a variable reluctance motor has no need to enlarge the scale of the spindle motor as discussed in the conventional spindle motor using a DC motor. Moreover, the spindle motor 13 of the present embodiment can obtain high torque output of the spindle 6 and the tap 8. As a result tapping of large-diameter workpiece can be realized without producing a large-scale tapping unit 1.

While the invention has been practically shown and described with reference to a preferred embodiment, it will be understood by those skilled in the art that various other modifications may be made without departing from the spirit and scope of the invention. For example, a drill may be used as the tool of the machine tool instead of a tap.

What is claimed is:

1. A machine tool for machining a work piece, comprising:
    a housing;
    a spindle having a first end supported within the housing such that the spindle rotates about an axis of the spindle and reciprocates along the spindle axis;
    a tool attached to a second end of the spindle;
    a feed motor installed in the housing for reciprocating the spindle along the spindle axis;
    a variable reluctance motor installed in the housing for rotating the spindle about the spindle axis; and
    synchronous control means for controlling the feed motor and variable reluctance motor.

2. The machine tool of claim 1, in which:
    the synchronous control means controls the feed motor to reciprocate the spindle along the spindle axis at a desired reciprocation speed; and
    the synchronous control means controls the variable reluctance motor to rotate the spindle about the spindle axis at a desired rotation speed; wherein
    the desired reciprocation speed and the desired rotation speed may be optimally set for the machining of the work piece.

3. The machine tool of claim 1, further comprising:
    rotation speed detecting means for detecting the rotation speed of the spindle; wherein
    the synchronous control means controls the feed motor to move the spindle at a reciprocation speed that is synchronized with the rotation speed.

4. The machine tool of claim 3, in which the control means controls the spindle to move along the axis at a reciprocation speed that is a predetermined ratio of a rotation speed of the spindle, the predetermined ratio corresponding to a pitch of the tool.

5. The machine tool of claim 3, in which the rotation speed detecting means comprises:
    an encoder for detecting the rotating position of the spindle; and
    a counter for determining the rotation speed from the rotating position of the spindle.

6. The machine tool of claim 1, in which the tool is chosen from the group of tools consisting of a tap and a drill bit.

7. The machine tool of claim 1, in which the feed motor is a servo motor.

8. A machine tool for machining a work piece, comprising:
    a cylindrically shaped housing;
    a spindle sleeve coaxially mounted within the housing such that the spindle sleeve reciprocates along and rotates about an axis, where a cam groove is spirally formed on the outer surface of the spindle sleeve;
    a spindle having a first end coaxially mounted within the spindle sleeve such that the spindle rotates about the axis relative to the spindle sleeve and reciprocates along the axis with the spindle sleeve, where rotation grooves are formed on the first end of the spindle;
    a tool attached to a second end of the spindle;
    a feed motor installed in the housing for reciprocating the spindle along the axis, the feed motor comprising
        a feed motor stator attached to the inside of the housing, a feed motor rotor rotatably mounted within the feed motor stator having a hole through which the spindle sleeve passes, and cam followers mounted on the surface of the hole in the feed motor rotor for engaging the cam groove such that, when the feed motor rotor rotates, the cam followers act on the cam groove to reciprocate the spindle sleeve and spindle along the axis;

a variable reluctance motor installed in the housing for rotating the spindle about the axis, the variable reluctance motor comprising a reluctance motor stator attached to the inside of the housing;

a reluctance motor rotor rotatably mounted within the reluctance motor stator, where straight grooves are formed on the reluctance motor rotor in the direction of the axis for engaging the rotation grooves formed on the first end of the spindle such that the rotation of the reluctance motor rotor causes the spindle to rotate about the axis while allowing the spindle to reciprocate along the axis; and synchronous control means for controlling the feed motor and variable reluctance motor.

9. The machine tool of claim 8, in which:

the synchronous control means controls the feed motor to reciprocate the spindle along the axis at a desired reciprocation speed; and the synchronous control means controls the variable reluctance motor to rotate the spindle about the axis at a desired rotation speed; wherein the desired reciprocation speed and the desired rotation speed may be optimally set for the machining of the work piece.

10. The machine tool of claim 8, further comprising:

rotation speed detecting means for detecting the rotation speed of the spindle; wherein the synchronous control means controls the feed motor to move the spindle at a reciprocation speed that is synchronized with the rotation speed.

11. The machine tool of claim 10, in which the control means controls the spindle to move along the axis at a reciprocation speed that is a predetermined ratio of a rotation speed of the spindle, the predetermined ratio corresponding to a pitch of the tool.

12. The machine tool of claim 10, in which the rotation speed detecting means comprises:

an encoder for detecting the rotating position of the spindle; and a counter for determining the rotation speed from the rotating position of the spindle.

13. The machine tool of claim 8, in which the tool is chosen from the group of tools consisting of a tap and a drill bit.

14. The machine tool of claim 8, in which the feed motor is a servo motor.

15. A machine tool for machining a work piece, comprising:

a cylindrically shaped housing;

a spindle sleeve coaxially mounted within the housing such that the spindle sleeve reciprocates along and rotates about an axis, where a cam groove is spirally formed on the outer surface of the spindle sleeve;

a spindle having a first end coaxially mounted within the spindle sleeve such that the spindle rotates about the axis relative to the spindle sleeve and reciprocates along the axis with the spindle sleeve, where rotation grooves are formed on the first end of the spindle;

a tool attached to a second end of the spindle;

a feed motor installed in the housing for reciprocating the spindle along the axis, the feed motor comprising a feed motor stator attached to the inside of the housing, a feed motor rotor rotatably mounted within the feed motor stator having a hole through which the spindle sleeve passes, and cam followers mounted on the surface of the hole in the feed motor rotor for engaging the cam groove such that, when the feed motor rotor rotates, the cam followers act on the cam groove to reciprocate the spindle sleeve and spindle along the axis;

a variable reluctance motor installed in the housing for rotating the spindle about the axis, the variable reluctance motor comprising a reluctance motor stator attached to the inside of the housing;

a reluctance motor rotor rotatably mounted within the reluctance motor stator, where straight grooves are formed on the reluctance motor rotor in the direction of the axis for engaging the rotation grooves formed on the first end of the spindle such that the rotation of the reluctance motor rotor causes the spindle to rotate about the axis while allowing the spindle to reciprocate along the axis;

synchronous control means for controlling the feed motor and variable reluctance motor; and rotation speed detecting means for detecting a rotation speed of the spindle; wherein the synchronous control means controls the feed motor to move the spindle at a reciprocation speed that is synchronized with the rotation speed.

16. The machine tool of claim 15, in which the control means controls the spindle to move along the axis at a reciprocation speed that is a predetermined ratio of the rotation speed of the spindle, the predetermined ratio corresponding to a pitch of the tool.

17. The machine tool of claim 16, in which the rotation speed detecting means comprises:

an encoder for detecting the rotating position of the spindle; and a counter for determining the rotation speed from the rotating position of the spindle.

18. The machine tool of claim 17, in which the tool is chosen from the group of tools consisting of a tap and a drill bit.

19. The machine tool of claim 18, in which the feed motor is a servo motor.

* * * * *